(No Model.) 2 Sheets—Sheet 1.
T. W. LEMIEUX.
APPARATUS FOR TRANSMITTING POWER.
No. 395,446. Patented Jan. 1, 1889.
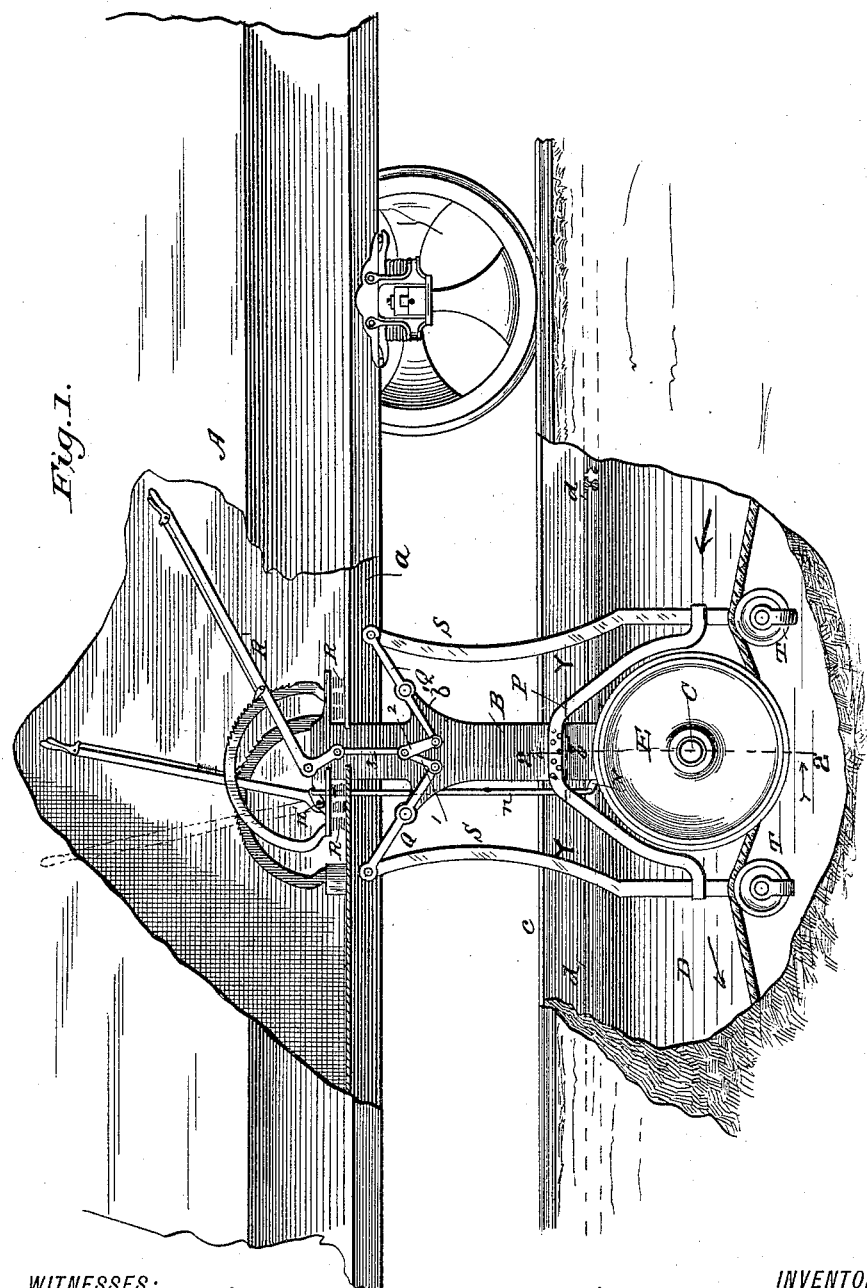
WITNESSES:
Fred G. Dieterich
Colon C. Kemon
INVENTOR.
T. W. Lemieux
BY Munn & Co
ATTORNEY.

(No Model.) 2 Sheets—Sheet 2.
T. W. LEMIEUX.
APPARATUS FOR TRANSMITTING POWER.
No. 395,446. Patented Jan. 1, 1889.
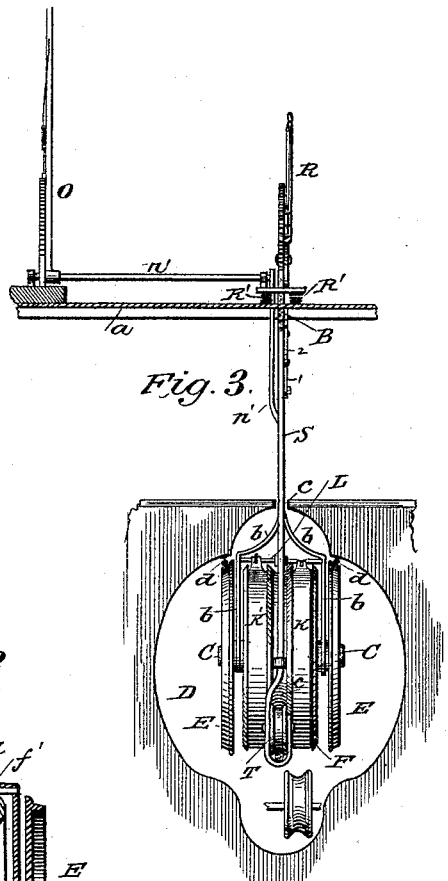
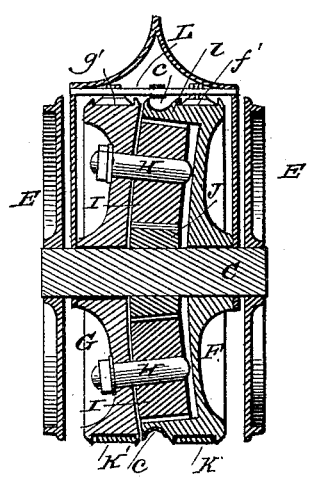
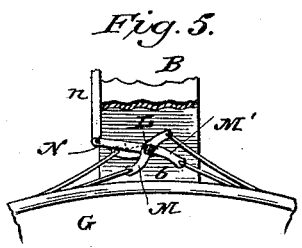
WITNESSES:
Fred G. Dieterich
John C. Kenion
INVENTOR.
T. W. Lemieux
BY Munn & Co.
ATTORNEY

UNITED STATES PATENT OFFICE.

TIMOTHY W. LEMIEUX, OF DULUTH, MINNESOTA.

APPARATUS FOR TRANSMITTING POWER.

SPECIFICATION forming part of Letters Patent No. 395,446, dated January 1, 1889.

Application filed March 26, 1888. Serial No. 268,524. (No model.)

*To all whom it may concern:*

Be it known that I, TIMOTHY W. LEMIEUX, of Duluth, in the county of St. Louis, in the State of Minnesota, have invented a new and useful Improvement in Devices for Transmitting Power, of which the following is a specification.

My invention consists of a device for transmitting a reversible motion from a continuous-running cable or belt disposed either above or under ground to a wheeled vehicle which can be readily adjusted and controlled by the operator on the car.

My invention is more especially adapted for use in connection with cable traction-railways, and has for its object to produce a device which will effectually operate as a means for reversing the moving direction of the car, and also to produce a simple and positive gripping device in its connection with the cable and the car.

My invention further consists in the peculiar construction and arrangement of parts, as will hereinafter be fully explained, and particularly pointed out in the claims.

In the accompanying drawings, Figure 1 is a sectional side elevation of my device as applied in use. Fig. 2 is a longitudinal section taken on the line 2 2, Fig. 1, omitting the adjusting attachments above the line Y, and showing the relative position of the intermediate gear, &c. Fig. 3 is an end elevation of the complete apparatus. Fig. 4 is a side view of the machine, omitting band-wheel G and showing the position of the gear-wheels; and Fig. 5 is a detail view, hereinafter referred to.

In the drawings, A denotes the car, to the base $a$ of which is secured a downwardly-depending standard, B. The lower end of this standard, at a point below the conduit-slot $c$, is formed into a yoke, the side arms, $b\ b$, of which support a shaft, C.

D is the cable-conduit provided near its upper end with inverted track-rails $d\ d$. The rails $d\ d$ are preferably arranged in the conduit at a point below the connection of the slot-rails with the conduit yokes or tubes.

E E are wheels keyed or otherwise secured upon the outer ends of the shaft C, and bear with their upper peripheral surfaces against the rails $d\ d$, for a purpose, as will be hereinafter described.

F is a band-wheel loosely mounted on the shaft C, and having the inner face of its projecting flange $l$ beveled and cogged, as clearly shown. The outer surface of the flange is provided with a suitable groove, $c$, to receive the cable. A second band-wheel, G, is loosely mounted on the shaft C, as shown. Journaled on pivot-bolts H, projecting from the inner surface of the wheel G, are four small beveled gear-wheels, I, which extend closely within the beveled flange $l$ of the band-wheel F, and mesh with the interior cogged rim of said flange. Keyed to the shaft C is a small gear-wheel, J, which is disposed centrally between and meshing with the gears I, as clearly shown in Fig. 4. The outer peripheral surfaces of the band-wheels F and G are provided with grooves $f'$ and $g'$, adapted to receive therein the band-brakes $k\ k'$, the peculiar construction and operation of which I will now describe.

Journaled in the side arms, $b\ b$, of the standard B, and above the band-wheels F and G, is a shaft, L, to which shaft L the ends of the band-brakes are attached.

By reference to Fig. 5 of the drawings it will be observed that the ends of the brake-bands are each connected to the shaft L by means of an S-shaped purchase, M M'. The purchases M M' are arranged in different angles upon the shaft L, as shown. A crank-arm, N, projects from the shaft L centrally between the brake-bands. This arm is connected by means of the connecting-rod $n$ to the end of a rock-shaft, $n'$, upon the car-body, upon which is mounted the operating-lever O. It will be understood that the purchases M and M' and the crank-arm N are integral or fixed to the shaft L. By this construction it will be seen that by throwing the lever backward, as shown in full lines, Fig. 1, the band-brake K' will be applied to the wheel G; but by throwing the lever forward to a position shown in dotted lines, Fig. 1, the brake-band will be released from the wheel G and the band K applied to the wheel F. When it is desired to stop the car, the lever O is adjusted in a central position, which releases both band-brakes and permits the stopping of the car.

P is a yoke strongly secured to the upright standard B, the downward-projecting ends extending before and in rear of the band-pulleys, as clearly shown in Fig. 1 of the drawings.

Upon laterally-projecting arms b' of the standard B are pivoted the levers Q Q, the inner ends of which are connected by means of the toggle-links 1 2 3 to the lower end of the operating-lever R, as seen in Fig. 1. To the outer ends of the levers Q Q are pivoted the upper ends of the downwardly-extending bars S, which bars pass through the conduit-slot and carry at their lower ends the small cable-supporting sheaves T. The bars S are steadied and guided by the ends of the yoke P, as shown. By this construction it will be seen that the cable passing over the sheaves T may be readily brought in contact with the sheave F, and by means of the lever R may be raised or lowered at the will of the operator.

In securing the standard B to the car-body it is preferred to support it in a yielding position, and thereby avoid any irregularity of the road-bed being imparted to the cable. To this end I support the upper end of the standard on a series of springs, R R, as shown in Fig. 1. The tension of the springs R R also serves to normally force the standard B (which sustains the underground mechanism) upward, thereby forcing the wheels E E against the rails d d, causing friction between said wheels E and the rails d, and thereby causing said wheels to travel on the rails d when the shaft C is revolved.

The operation of the device is as follows: In starting the car for a forward motion in the direction of the arrow, Fig. 1, the lever O is thrown forward, which motion will rock the shaft L, and by means of the S-shaped purchases cause the band-brake to be applied to the band-wheel F and securely hold the same from turning. The same movement of the lever releases the band-brake from the pulley G. Now, as the pulley F is securely held from turning and the cable is brought into a tight frictional contact with it, the same will act as an effectual grip, and thereby carry the car forward in the same direction with the cable. The forward movement of the car will cause the wheels E (which are held in frictional contact with the inverted rails d through the medium of the tension of the springs R) to revolve in a forward direction, and thereby cause the shaft C, to which the said wheels E are fixed, to rotate in a direction reverse to the movement of the car, which movement of the shaft, through the medium of the pinion J, fixed thereon, will cause the gears I, the outer teeth of which engage with the internal teeth of the pulley F, (which during this operation is held from turning,) to travel with the loose pulley G in a direction similar to the shaft C. When it is desired to cause the car to travel in a reverse direction, the brake-band is released from the wheel F and applied to the wheel G.

By reference to Fig. 4 it will be seen that should the cable be traveling in the direction shown by the arrow, the wheel F, being in contact with the cable, will revolve in a reverse direction. As before stated, the pulley G is held from turning by means of its band-brake. The internal gear surface on the wheel F will cause the gears I to revolve in the direction shown by the arrows, which gears I will impart motion to the gear J upon the shaft C and cause the same to revolve in a reverse direction to the moving cable. The shaft C, having fixed to its outer ends the wheels E E, will cause the same to revolve with it, and they, running against the inverted rails d, cause the car to travel in a direction reverse to the moving cable.

By this arrangement it will be observed I have constructed a device which may be easily operated, effective in its movement, and filling a want long desired in the practical construction and operation of cable-traction systems.

Having thus described my invention, what I claim as new, and desire to secure by Letters Patent, is—

1. In a device for transmitting a motion to a wheeled vehicle, the combination, with the standard B, a transverse shaft, C, journaled therein, the wheels E E, secured to the outer ends of said shaft, and means for reversing the motion of said shaft, substantially as described, of the inverted rails supported above the wheels, as and for the purpose described.

2. In a device for transmitting a reversible motion from a continuous-running cable to a car, the combination, with the standard B, the shaft C at its lower end, and means, substantially as described, for reversing the motion of said shaft, of the bars S, carrying cable-supporting sheaves T at their lower ends and connected at their upper ends to the standard B, and means, substantially as described and shown, for raising and lowering said bars, as and for the purpose specified.

3. In a device for transmitting a reversible motion to a car, the combination, with the standard B, secured to said car, of the shaft C, the wheels secured on the outer ends thereof, the band-wheels F G, mounted on said shaft, the wheel F arranged for frictional contact with the cable, and the intermediate gearing for reversing the motion of said shaft, all arranged substantially as and for the purposes described.

4. In a device for transmitting a reversible motion to a car, the combination, with the standard B, carrying at its lower end the reversing mechanism, substantially as described, and provided with the yoke P, of the bars S, carrying the cable-sheaves T, said bars S guided in the yoke P, as shown, and means, substantially as described, for raising and lowering the bars S, as and for the purpose set forth.

5. In a device for transmitting a reversible motion to a car, the combination, with the standard B, the shaft C, the wheels E E, secured on said shaft, the inverted track-rails d d, and the gear J, fixed on said shaft C, of the band-wheels F G, loosely mounted on the shaft C, the intermediate gearing arranged on said band-wheels, said gearing imparting reversible motion to the gear J and shaft, the band-wheel F being arranged for frictional contact with the cable, substantially as and for the purpose specified.

6. In a device for transmitting a reversible motion to a car, the combination, with the standard B, the shaft C, journaled therein, the wheels E E, secured on said shaft, the inverted rails d, and the gear J, of the pulley F, loosely mounted on the shaft C and adapted to be revolved by contact with the cable, said wheel F provided with annular beveled flange f, provided with internal cogs, the pulley G, loosely mounted on said shaft C, the gears I, mounted on one face of the pulley G and adapted to gear with the cog-flange of the wheel F and the gear J, and suitable brake mechanism, substantially as shown, for holding either of the wheels F and G from turning, all arranged substantially as and for the purpose described.

TIMOTHY W. LEMIEUX.

Witnesses:
JAMES A. BOGGS,
RUFUS H. REDMAN.